April 26, 1932.  H. C. FIEGE  1,855,227
CABLE CLAMP
Filed May 26, 1930
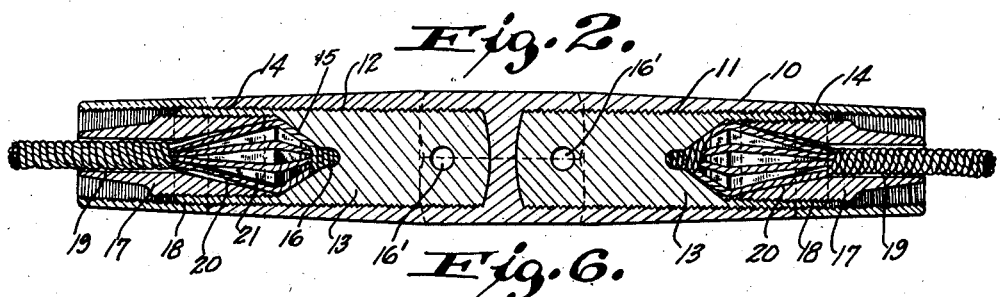
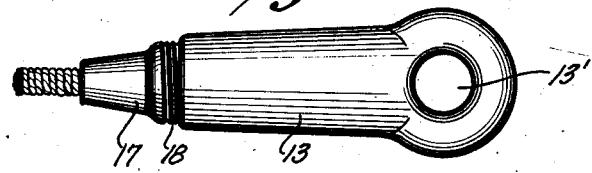
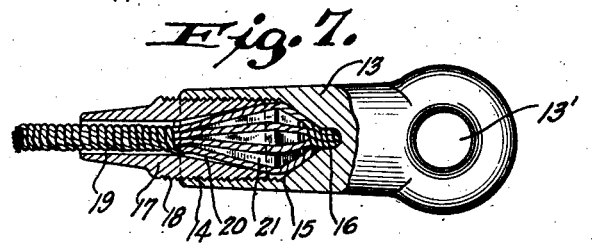
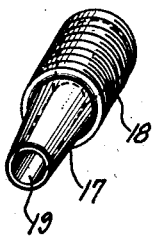
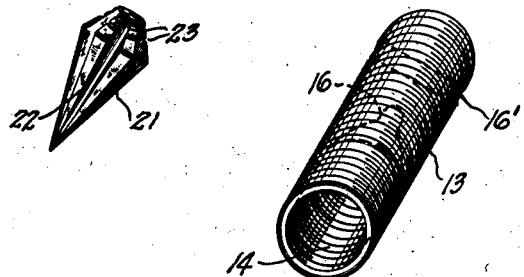
INVENTOR.
Henry C. Fiege
BY
Morsell, Feeney & Morsell
ATTORNEYS Patented Apr. 26, 1932

1,855,227

UNITED STATES PATENT OFFICE

HENRY C. FIEGE, OF BAYFIELD, WISCONSIN

CABLE CLAMP

Application filed May 26, 1930. Serial No. 455,723.

This invention relates to improvements in cable clamps.

Heretofore, the fastening of cable ends together, or the securing of a single cable end to a support has occasioned considerable difficulty. Present methods have made it troublesome to form a proper joint in the construction of cable fences and to properly secure the end of a guy wire to a connecting point. Where a strong joint is required it has been common practice to weld the cable ends to connecting members which necessitated the use of heating apparatus and which consumed considerable time. For weaker joints, various clamping devices have been utilized, but said devices have been found to withstand only a very limited strain.

It is, therefore, one of the objects of this invention to provide an improved cable clamp which may be quickly attached to a cable and which will withstand an unusual amount of strain.

A more specific object of this invention is to provide a cable clamp in which a double-cone wedging element is utilized to firmly grip the cable end.

A further object of this invention is to provide an improved cable clamp which is simple in construction, neat in appearance, and well adapted for the purpose described.

With the above and other objects in view, the invention consists of the improved cable clamp, and all its parts and combinations, as set forth in the claims, and all equivalents thereof.

In the accompanying drawings, in which the same reference numerals designate the same parts in all of the views:

Fig. 1 is a plan view of the improved cable clamp;

Fig. 2 is a longitudinal sectional view thereof;

Figs. 3, 4 and 5 are perspective views of the several elements which make up the device;

Fig. 6 is a plan view of a modification; and

Fig. 7 is a broken away sectional view of said modification.

Referring to the drawings, the numeral 10 designates an outer turnbuckle having bores 11 and 12 formed in each end thereof. One of said bores is provided with left hand internal threading and the other with right hand threading. Outer clamping members 13 are threaded in said bores, said members being oppositely threaded. The outer end of each of said members 13 is formed with a threaded bore 14 which joins an inner unthreaded conical recess 15. A smaller recess 16 extends inwardly from the end of the conical recess. The inner end of each member 13 has a transverse bore 16'. An inner clamping member or nut 17 has external threading 18, and is adapted to be threaded into the outer clamping member 13. The inner clamping member has a bore 19 which communicates with an enlarged conical recess portion 20 at the inner end of the member. A wedging element 21 which is substantially a double-cone in shape is positionable in the recesses 15 and 20. Said element is formed with spaced apart longitudinal grooves 22, and at one end, with circumferential grooves 23.

In the modification illustrated in Figs. 6 and 7, the construction of the clamping portions is identical to the construction in the principal form. The portion 13, however, is not externally threaded, as no turnbuckle 10 is utilized, and said portion 13 has its outer end formed with an eye 13' to facilitate connection of the cable end to a support.

To secure two cable ends together with the device forming the preferred form of the invention, the cable ends are first slipped into the bores 19 of the members 17 (one of said members being illustrated separately in Fig. 5). The end of each cable is then frayed out in the conical recess 20. Next, the wedging member 21 is inserted in the recess, with the separate strands of the cable positioned in the grooves 22, as shown in Fig. 2. One of the members 13 is then threaded on each member 17 to cause the strands of the cable to be clamped between the wedging member and the walls of the conical recess 20. At the same time, due to the turning of the member 13 on the member 17, the strands at the extreme end of the cable are twisted together at the inner end of the wedging member 21, into the recess 16. The circumferential grooves 23 of the wedging member assist in holding the cable by biting into the latter. To serve as leverage in tightening the parts more firmly together, a rod may be inserted in the perforation 16' of the member 13. When the members 13 have been secured to the two cable ends, they are inserted in the bores 11 and 12 of the turnbuckle 10. The latter is then turned by means of a wrench to draw the clamping portions inwardly, and to secure the desired tension upon the cable. The sleeves 24 may be used, if desired, to form a more finished appearance and to lock the turnbuckle in position.

The assembly of the modified form shown in Figs. 6 and 7 is substantially the same, except that the turnbuckle portion is not used. A hook secured to a support may be connected to the eye 13', or a swivel hook may be utilized in the connection. In fact, with the two forms of unit on hand, almost any type of connection that is desired can be made in the minimum of time.

Due to the novel shape of the wedging members 21, by means of which the cable ends are clamped in position, the device will stand a maximum amount of strain.

Although only two forms of the invention have been shown and described, it is not desired to be limited to these exact showings, as the broad concept of the invention covers all changes and modifications as may come within the scope of the claims.

What I claim is:

1. A cable clamp comprising a pair of clamping members having recesses therein, one of said clamping members having a bore communicating with the recesses through which a frayed end of a cable is inserted and the other clamping member having a small recess communicating with the inner end of the main recess, and a wedging element, said clamping members being movable with respect to one another to cause the wedging element to clamp the frayed cable end between said element and the walls of the recesses and to force the end of the cable into the small recess in one of the clamping members, the various strands of said frayed end surrounding the wedging element.

2. A cable clamp comprising a pair of clamping members having recesses therein, one of said clamping members having a bore communicating with the recesses through which the end of a cable is inserted, and a wedging element which is substantially a double cone in shape and having longitudinal and circumferential grooves therein, said clamping members being movable with respect to one another to cause the wedging element to clamp the cable end between said element and the walls of the recesses.

3. A cable clamp comprising an outer clamping member having a recess therein, an inner clamping member also having a recess, each of said recesses being substantially conical in shape with the wide portions of the recesses adjacent one another, one of said clamping members having a bore communicating with the recess through which the end of a cable is inserted and the other clamping member having a small recess communicating with the small end of the conical recess, and a wedging element substantially the same shape as the combined conical recesses, said clamping members being in threaded connection with one another to provide for movement of the parts together to cause the wedging element to clamp the cable between said element and the walls of the recesses and to cause winding of the end of the cable into the small recess in one of the clamping members.

4. A cable clamp comprising two units each consisting of an outer clamping member having a recess therein, an inner clamping member also having a recess, each of said recesses being substantially conical in shape with the wide portions of the recesses adjacent one another, one of said clamping members having a bore communicating with the recess through which the end of a cable is inserted, and a wedging element substantially the same shape as the combined recesses, said clamping members being movable with respect to one another to cause the wedging element to clamp the cable end between said element and the walls of the recesses, and a turnbuckle threadedly engageable with said two units for adjusting the relative positions of the same, the cable ends being held by the units independently of the turnbuckle.

5. A cable clamp comprising a pair of clamping members each having substantially conical recesses therein with the wide portions of the recesses adjacent one another, one of said clamping members having a bore communicating with the recess through which the end of a cable is inserted and the other clamping member having a small recess communicating with the small end of the conical recess, and a wedging element substantially the same shape as the combined conical recesses, said clamping members being in threaded connection with one another to provide for movement of the parts together to cause the wedging element to clamp the cable between said element and the walls of the recess and to cause forcing of the end of the cable into the small recess in one of the clamping members.

6. A cable clamp comprising two units each of said units consisting of a pair of recessed clamping members, one of said clamping members having a bore communicating with the recess, and a wedging element within the recess of the clamping members, said clamping members being threadedly engageable with one another to cause the wedging element to clamp a cable end within the recesses, and a turnbuckle threadedly engageable with said two units for adjusting the relative positions of the same and thereby drawing the two cable ends closer together or moving them farther apart, each cable end being held by its unit independently of the turnbuckle.

In testimony whereof I affix my signature.

HENRY C. FIEGE.